US012068536B2

(12) United States Patent
Zhu

(10) Patent No.: US 12,068,536 B2
(45) Date of Patent: Aug. 20, 2024

(54) ANTENNA UNIT AND TERMINAL DEVICE

(71) Applicant: VIVO MOBILE COMMUNICATION CO., LTD., Chang'an Dongguan (CN)

(72) Inventor: Welcal Zhu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 418 days.

(21) Appl. No.: 17/217,666

(22) Filed: Mar. 30, 2021

(65) Prior Publication Data

US 2021/0218137 A1 Jul. 15, 2021

Related U.S. Application Data

(63) Continuation of application No. PCT/CN2019/098537, filed on Jul. 31, 2019.

(30) Foreign Application Priority Data

Sep. 30, 2018 (CN) ......................... 201811159381.2

(51) Int. Cl.
*H01Q 1/24* (2006.01)
*H01Q 1/52* (2006.01)
(Continued)

(52) U.S. Cl.
CPC ............... *H01Q 1/521* (2013.01); *H01Q 1/24* (2013.01); *H01Q 7/00* (2013.01); *H01Q 9/42* (2013.01)

(58) Field of Classification Search
CPC ............ H01Q 1/521; H01Q 1/24; H01Q 7/00; H01Q 9/42; H01Q 1/243; H01Q 1/44;
(Continued)

(56) References Cited

U.S. PATENT DOCUMENTS 7,102,578 B2 9/2006 Minemura
2009/0233657 A1 9/2009 Ogawa
(Continued)

FOREIGN PATENT DOCUMENTS

CN 101164323 A 4/2008
CN 201256180 Y 6/2009
(Continued)

OTHER PUBLICATIONS

Extended European Search Report for related Application No. 19866930.1; reported on Nov. 4, 2021.
(Continued)

*Primary Examiner* — Hai V Tran
*Assistant Examiner* — Michael M Bouizza
(74) *Attorney, Agent, or Firm* — von Briesen & Roper, s.c.

(57) ABSTRACT

The present invention provides an antenna unit and a terminal device. The antenna unit includes the first antenna module and the second antenna module, the first antenna module includes the first radiator and the feed connected to the first radiator, and the second antenna module includes the second radiator connected to the first radiator. The first radiator includes the at least one first contact, and the second radiator includes the at least one second contact. When the angle between the first radiator and the second radiator is less than or equal to the first angle, the second radiator is electrically connected to the first radiator in the target manner. The target manner is that N first contacts of the at least one first contact are correspondingly in contact with N second contacts of the at least one second contact, where N is a positive integer.

14 Claims, 7 Drawing Sheets

(51) Int. Cl.
*H01Q 7/00* (2006.01)
*H01Q 9/42* (2006.01)

(58) Field of Classification Search
CPC ............ H01Q 5/328; H01Q 1/48; H01Q 1/36; H01Q 1/50
See application file for complete search history.

(56) References Cited

U.S. PATENT DOCUMENTS

| | | | | |
|---|---|---|---|---|
| 2012/0299785 | A1* | 11/2012 | Bevelacqua | H01Q 1/243 343/702 |
| 2014/0240178 | A1 | 8/2014 | Chun et al. | |
| 2017/0110786 | A1 | 4/2017 | Liu | |
| 2017/0351297 | A1 | 12/2017 | Kim et al. | |
| 2018/0366813 | A1 | 12/2018 | Kim et al. | |

FOREIGN PATENT DOCUMENTS

| | | | |
|---|---|---|---|
| CN | 108140928 | A | 6/2018 |
| CN | 108292796 | A | 7/2018 |
| CN | 109449569 | A | 3/2019 |
| CN | 109524760 | A | 3/2019 |
| EP | 2528165 | A1 | 11/2012 |

OTHER PUBLICATIONS

Written Opinion & International Sear Report for related International Application No. PCT/CN2019/098537; report dated Oct. 29, 2019.

First Office Action for related Chinese Application No. 201811159381.2; report dated Oct. 11, 2019.

* cited by examiner (a)

(b)

ANTENNA UNIT AND TERMINAL DEVICE

This application is a continuation application of a PCT Application No. PCT/CN2019/098537 filed on Jul. 31, 2019, which claims priority to Chinese Patent Application No. 201811159381.2, filed with the China National Intellectual Property Administration on Sep. 30, 2018, and entitled "ANTENNA UNIT AND TERMINAL DEVICE", the disclosures of which are incorporated in their entireties by reference herein.

TECHNICAL FIELD

The embodiments of the present invention relate to the field of communications technologies, and in particular, to an antenna unit and a terminal device.

RELATED ART

With the continuous development of terminal technologies, there are more and more terminal devices with two or more screens.

At present, for example, a terminal device with two screens may include a terminal device with foldable screens. The terminal device may include two screens (for example, a primary screen and a secondary screen). When the screens of the terminal device are in the extended state, the two screens may be combined into one screen. When the screens of the terminal device are in the folded state, the two screens may be two independent screens.

However, a terminal device with the foldable screens may include a first antenna disposed on a side of the primary screen of the terminal device and a second antenna disposed on a side of the secondary screen of the terminal device. In this way, when the screens of the terminal device are in the folded state, because the first antenna on the side of the primary screen of the terminal device may overlap the second antenna on the side of the secondary screen, electromagnetic coupling is formed between the first antenna and the second antenna, and electromagnetic interference is generated between each other. As a result, the performance of the antennas is affected and the performance of the antennas is deteriorated.

SUMMARY

The embodiments of the present invention provide an antenna unit and a terminal device, to resolve the problem that electromagnetic coupling is formed between two antennas of an existing terminal device with foldable screens and the performance of the antennas is deteriorated.

To resolve the foregoing technical problem, this application is implemented as follows:

According to a first aspect, the embodiments of the present invention provide an antenna unit. The antenna unit includes a first antenna module and a second antenna module. The first antenna module includes a first radiator and a feed connected to the first radiator, and the second antenna module includes a second radiator connected to the first radiator. The first radiator includes at least one first contact, and the second radiator includes at least one second contact. When an angle between the first radiator and the second radiator is less than or equal to a first angle, the second radiator is electrically connected to the first radiator in a target manner. The target manner is that N first contacts of the at least one first contact are correspondingly in contact with N second contacts of the at least one second contact, where N is a positive integer.

According to a second aspect, the embodiments of this disclosure provide a terminal device, and the terminal device includes the antenna unit in the first aspect.

In the embodiments of the present invention, the antenna unit includes the first antenna module and the second antenna module, the first antenna module includes the first radiator and the feed connected to the first radiator, and the second antenna module includes the second radiator connected to the first radiator. The first radiator includes the at least one first contact, and the second radiator includes the at least one second contact. When the angle between the first radiator and the second radiator is less than or equal to the first angle, the second radiator is electrically connected to the first radiator in the target manner. The target manner is that N first contacts of the at least one first contact are correspondingly in contact with N second contacts of the at least one second contact, where N is a positive integer. In the embodiments of the present invention, when the antenna unit is applied to the terminal device and screens of the terminal device are in the folded state, after contacts are symmetrically disposed on the first radiator and the second radiator, the contact on the first radiator and the contact on the second radiator in the terminal device are correspondingly in contact with each other, so that the first radiator and the second radiator are connected as a whole through the contacts. Therefore, the two radiators are approximate to one radiator. Because a current flow direction in one radiator is consistent, this can reduce electromagnetic interference caused because currents of the two radiators flow in opposite directions when the two radiators are close to each other. Therefore, in the embodiments of the present invention, the performance of the antenna unit can be improved. That is, in the embodiments of the present invention, contacts are symmetrically disposed on the two radiators in the antenna unit, so that the performance of the antenna unit can be improved.

DETAILED DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of this application. All other embodiments obtained by a person of ordinary skill in the art based on the embodiments of this application shall fall within the protection scope of this application.

The term “and/or” in this specification describes an association relationship of associated objects, indicating that three relationships may exist. For example, A and/or B may indicate three cases: Only A exists, both A and B exist, and only B exists. A character “/” in this specification indicates an “or” relationship between associated objects. For example, A/B indicates A or B.

In the specification and claims of this application, the terms such as “first” and “second” are used to distinguish different objects, but are not used to describe a particular sequence of the objects. For example, a first contact, a second contact, and the like are used to distinguish between different contacts, but are not used to describe a particular sequence of the contacts.

In the embodiments of the present invention, the term such as “exemplary.” or “for example” is used to indicate an example, an instance, or a description. Any embodiment or design solution described as “exemplary” or “for example” in the embodiments of the present invention should not be construed as being more preferred or advantageous than other embodiments or design solutions. To be precise, the use of the term such as “exemplary” or “for example” is intended to present a related concept in a specific manner.

In the description of the embodiments of the present invention, unless otherwise specified, the meaning of “a plurality of” means two or more. For example, a plurality of processing units mean two or more processing units.

The following first explains some nouns or terms in the claims and the specification of this application.

A terminal device with foldable screens is a terminal device with at least two screens, where the at least two screens may extend to form one screen or fold to form at least two independent screens. That is, the screen of the terminal device may be in the extended state or folded state. The following uses an example in which the terminal device with two screens (for example, a first screen and a second screen) for description.

The antenna unit provided in the embodiments of the present invention may be an antenna, or may be a unit that is in an antenna and that can implement the function of the antenna (for example, the antenna unit may not include a housing). This may be specifically determined according to an actual usage requirement, and is not limited in the embodiments of the present invention.

Figure 1:
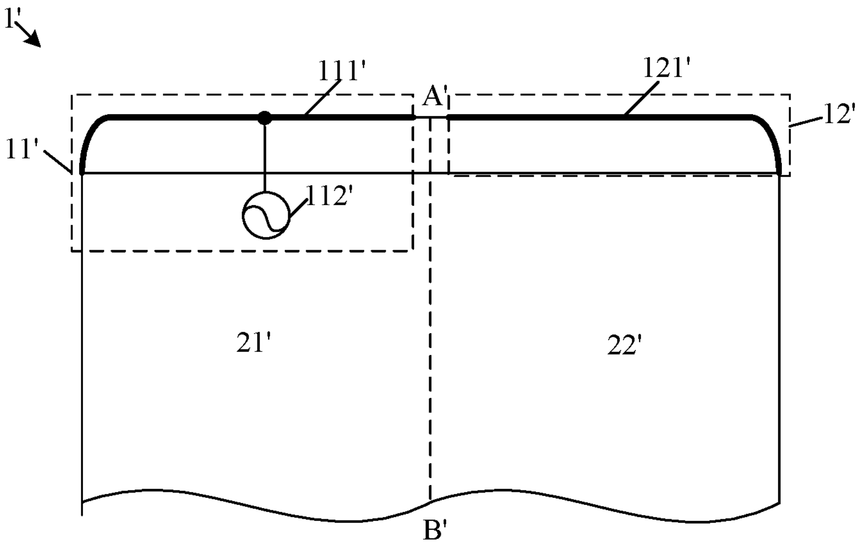
FIG. 1 is a schematic diagram of hardware of an antenna unit in the prior art.
Figure 1:
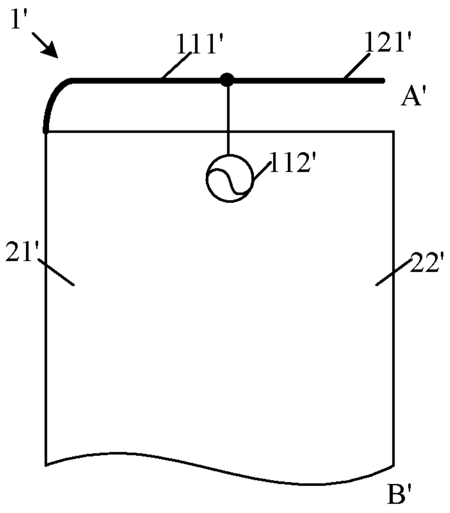

(a) in FIG. 1 is a schematic structural diagram of a terminal device when the screen of the terminal device is in an extended state. In this case, a first screen and a second screen of the terminal device 1' may extend to form one screen along a folding axis A'B'. For ease of description, a side of the first screen of the terminal device 1' may be referred to as a first screen side, and a side of the second screen of the terminal device may be referred to as a second screen side. (b) in FIG. 1 is a schematic structural diagram of a terminal device 1' when the screen of the terminal device 1' is in a folded state. In this case, a first screen and a second screen of the terminal device may fold to form two independent screens along a folding axis A'B'.

It should be noted that the first screen may be a primary screen and the second screen may be a secondary screen. Alternatively, the first screen may be a secondary screen and the second screen may be a primary screen. In the embodiments of the present invention, an example in which the first screen shown on the left is the primary screen, and the second screen shown on the right is the secondary screen in (a) of FIG. 1 is used for description.

As shown in (a) of FIG. 1, the terminal device 1' may include a first antenna 11' disposed on a side of the primary screen of the terminal device 1' and a second antenna 12" disposed on a side of the secondary screen. The first antenna 11' may include a first radiator 111' and a feed 112' connected to the first radiator 111', and the first radiator 111' may be connected to the first ground plate 21' on the side of the primary screen in the terminal device 1'. The second antenna 12' may include a second radiator 121', and the second radiator 121' may be connected to a second ground plate 22' on the side of the primary screen in the terminal device 1'. For ease of description, only the antenna unit of the terminal device is shown in the figure herein, and the foregoing antenna unit is used as an example for description.

As shown in (a) of FIG. 1, when the screens of the terminal device 1' are in the extended state, electromagnetic coupling between the first antenna 11' on the side of the primary screen of the terminal device 1' and the second antenna 12' on the side of the secondary screen is very weak and may be omitted. However, as shown in (b) of FIG. 1, when the screens of the terminal device 1' are in the folded state, because the first antenna 11' (for example, the first radiator 111') on the side of the primary screen of the terminal device 1' may overlap the second antenna 12" (for example, the second radiator 121') on the side of the secondary screen, strong electromagnetic coupling is formed between the first antenna 11' and the second antenna 12', and electromagnetic interference is generated between the first antenna 11' and the second antenna 12'. As a result, the performance of the antennas of the terminal device 1' is deteriorated.

In view of this, the embodiments of the present invention provide an antenna unit and a terminal device. The antenna unit includes a first antenna module and a second antenna module. The first antenna module includes a first radiator and a feed connected to the first radiator, and the second antenna module includes a second radiator connected to the first radiator. The first radiator includes at least one first contact, and the second radiator includes at least one second contact. When an angle between the first radiator and the second radiator is less than or equal to a first angle, the second radiator is electrically connected to the first radiator in a target manner. The target manner is that N first contacts of the at least one first contact are correspondingly in contact with N second contacts of the at least one second contact, where N is a positive integer. In the embodiments of the present invention, when the antenna unit is applied to the terminal device and screens of the terminal device are in the folded state, after contacts are symmetrically disposed on the first radiator and the second radiator, the contact on the first radiator and the contact on the second radiator in the terminal device are correspondingly in contact with each other, so that the first radiator and the second radiator are connected as a whole through the contacts. Therefore, the two radiators form one radiator. Because a current flow direction in one radiator is consistent, this can reduce electromagnetic interference caused because currents of the two radiators flow in opposite directions when the two radiators are close to each other. Therefore, in the embodiments of the present invention, the performance of the antenna unit can be improved. That is, in the embodiments of the present invention, contacts are symmetrically disposed on the two radiators in the antenna unit, so that the performance of the antenna unit can be improved.

The antenna unit (for example, an antenna) provided in the embodiments of the present invention may be applied to the terminal device, or may be applied to another electronic device that needs to use the antenna unit. This may be specifically determined according to an actual usage requirement, and is not limited in the embodiments of the present invention. The following uses an example in which the antenna unit is applied to the terminal device, to provide exemplary description of the antenna unit provided in the embodiments of the present invention.

Figure 2:
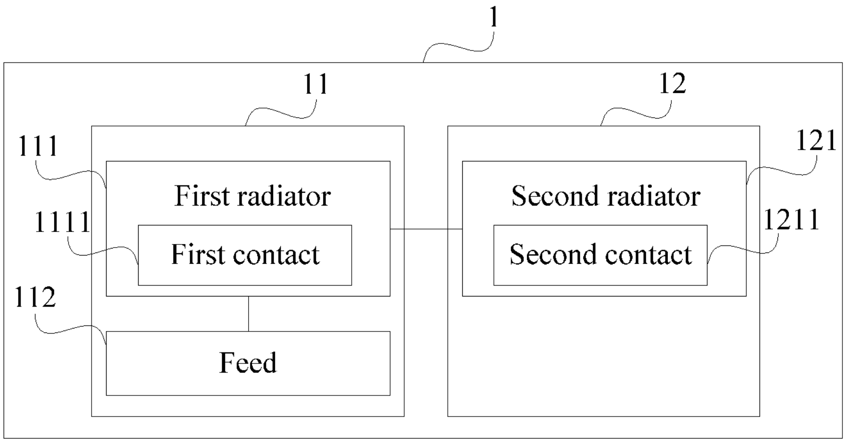
FIG. 2 is a first schematic structural diagram of an antenna unit according to an embodiment of the present invention.

As shown in FIG. 2, an embodiment of the present invention provides an antenna unit 1. The antenna unit 1 may include a first antenna module 11 and a second antenna module 12. The first antenna module 11 may include a first radiator 111 and a feed 112 connected to the first radiator, and the second antenna module 12 may include a second radiator 121 connected to the first radiator 111. The first radiator 111 may include at least one first contact 1111, and the second radiator 121 may include at least one second contact 1211.

In the embodiments of the present invention, because the first radiator and the second radiator may be symmetrically disposed, the at least one first contact and the at least one second contact may be symmetrically disposed on the first radiator and the second radiator. When the angle between the first radiator and the second radiator is less than or equal to a first angle, the second radiator is electrically connected to the first radiator in the target manner, where the target manner is that N first contacts of the at least one first contact may be correspondingly in contact with N second contacts of the at least one second contact (N is a positive integer).

In the embodiments of the present invention, the first contact and the second contact may be bumps of a metal material, or may be contact components in any other possible form. This may be specifically determined according to an actual usage requirement, and is not limited in the embodiments of the present invention. When the first contact of the first radiator is in contact with the second contact of the second radiator, the first radiator and the second radiator are connected to each other through the first contact and the second contact.

Optionally, in the embodiments of the present invention, the first angle may be $0°\pm\Delta_1$, where $\Delta_1$ is a relatively small value within a specific range (for example, greater than or equal to 0° and less than 5°). This may be specifically determined according to an actual usage requirement, and is not limited in the embodiments of the present invention. Assuming that the first angle is 0°, if the angle between the first radiator and the second radiator is 0°, the first radiator and the second radiator are parallel to each other and completely overlap. Assuming that the first angle is a preset angle greater than 0° (for example, 2°), if the angle between the first radiator and the second radiator is less than or equal to 2°, the first radiator and the second radiator are approximately parallel to each other and partially overlap.

In the embodiments of the present invention, when the angle between the first radiator and the second radiator is less than or equal to a first angle, that is, when the first radiator and the second radiator partially overlap or completely overlap, the second radiator may be electrically connected to the first radiator in the target manner, where the target manner may be that N first contacts of the at least one first contact of the first radiator may be in contact with N second contacts of the at least one second contact of the second radiator in one-to-one correspondence.

Optionally, in the embodiments of the present invention, a quantity of the at least one first contact and a quantity of the at least one second contact may be the same, or may be different. This may be specifically determined according to an actual requirement, and is not limited in the embodiments of the present invention.

Optionally, in the embodiments of the present invention, the antenna unit may further include a connection component. When an angle between the first radiator and the second radiator is less than or equal to a first angle, the second radiator may also be electrically connected to the first radiator through the connection component. In addition, when an angle between the first radiator and the second radiator is greater than a second angle, the second radiator may be electrically connected to the first radiator through the connection component.

It should be noted that the second angle is greater than the first angle. For example, the second angle may be $180°\pm\Delta_2$, where $\Delta_2$ is a relatively small value within a specific range (for example, greater than or equal to 0° and less than 5°). This may be specifically determined according to an actual usage requirement, and is not limited in the embodiments of the present invention.

Optionally, the connection component may be a flexible metal connection component, or may be a switch component, or may be any other possible connection component. This may be specifically determined according to an actual usage requirement, and is not limited in the embodiments of the present invention. For example, the connection component is a switch component. The terminal device may control the switch component to switch on or switch off according to an actual usage status, to control the first radiator and the second radiator to connect or disconnect.

In the embodiments of the present invention, the feed may be connected to a radio frequency front end module in the antenna unit, and the radio frequency front end module may be configured to transmit a current (for example, an alternating current) to the feed or receive a current from the feed.

Optionally, in the embodiments of the present invention, the first radiator and the second radiator may be metal parts. Correspondingly, the first radiator and the second radiator may be respectively referred to as a first metal arm and a second metal arm.

Figure 3:
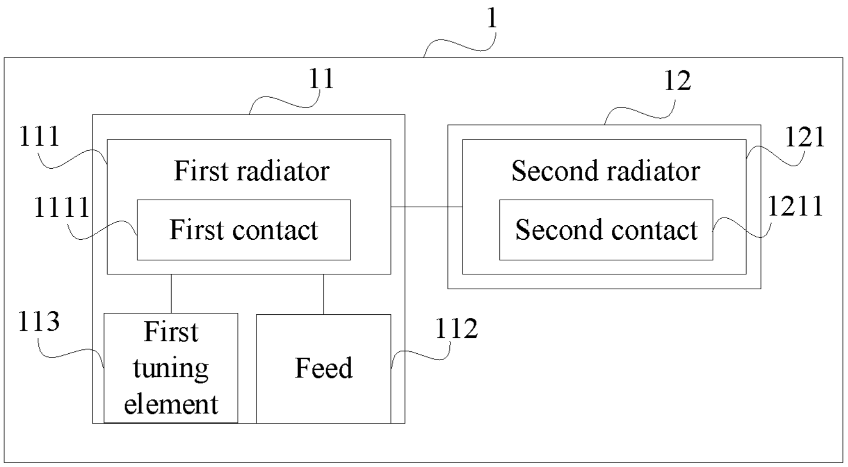
FIG. 3 is a second schematic structural diagram of an antenna unit according to an embodiment of the present invention.

Optionally, in the embodiments of the present invention, with reference to FIG. 2, in the antenna unit 1 shown in FIG. 3, the first antenna module 11 may further include a first tuning element 113 connected to the first radiator 111.

In the embodiments of the present invention, the first tuning element may be configured to tune the resonant length of the antenna unit. The resonant length may be indicated by a distance by which the current flows in the radiator of the antenna unit. As can be seen according to the basic working principle of the antenna, the resonant length of the antenna unit is inversely proportional to a resonant frequency of the antenna. Specifically, as the resonant length of the antenna unit is larger, the resonant frequency of the antenna is lower. As the resonant length is smaller, the resonant frequency of the antenna is higher. Therefore, the resonant length of the antenna unit is tuned, so that the antenna may generate different resonant frequencies.

Optionally, in the embodiments of the present invention, the first tuning element may be configured to increase the resonant length of the antenna unit, to decrease the resonant frequency of the antenna unit. The first tuning element may also be configured to decrease the resonant length of the antenna unit, to increase the resonant frequency of the antenna unit.

Figure 4:
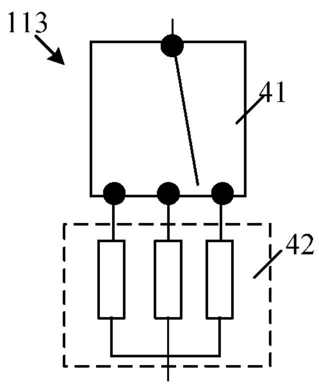
FIG. 4 is a schematic diagram of hardware of a tuning element according to an embodiment of the present invention.

Optionally, in the embodiments of the present invention, the first tuning element may be a capacitor component with a variable capacitance value. Alternatively, as shown in FIG. 4, the first tuning element 113 may include a switch 41 (for example, a single-pole multi-throw switch) and a plurality of capacitor components 42. The switch 41 may be connected to at least one of the plurality of capacitor components 42 according to an actual usage requirement, to tune the resonant length of the antenna unit. Certainly, the first tuning element may also be a tuning element in any other possible form for tuning the resonant length of the antenna unit. This may be specifically determined according to an actual usage requirement, and is not limited in the assemblies of the present invention.

Figure 5:
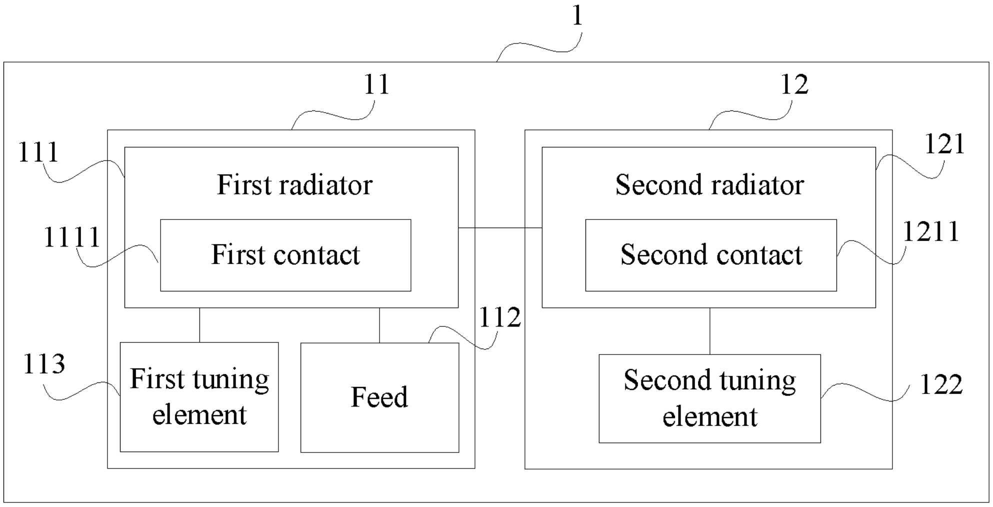
FIG. 5 is a third schematic structural diagram of an antenna unit according to an embodiment of the present invention.

Optionally, in the embodiments of the present invention, with reference to FIG. 3, in the antenna unit 1 shown in FIG. 5, the second antenna module 12 may also include a second tuning element 122 connected to the second radiator 121.

In the embodiments of the present invention, the second tuning element may be configured to tune the resonant length of the antenna unit. Optically, the second tuning element may be configured to increase the resonant length of the antenna unit, to reduce the resonant frequency of the antenna unit. The second tuning element may also be configured to decrease the resonant length of the antenna unit, to increase the resonant frequency of the antenna unit.

Optionally, in the embodiments of the present invention, the second tuning element may be a capacitor component with a variable capacitance value. Alternatively, the second tuning element may include a switch (for example, a single-pole multi-throw switch) and a plurality of capacitor components. The switch may be connected to at least one of the plurality of capacitor components according to an actual usage requirement, to tune the resonant length of the antenna unit. Certainly, the second tuning element may also be a tuning element in any other possible form for tuning the resonant length of the antenna unit. This may be specifically determined according to an actual usage requirement, and is not limited in the embodiments of the present invention.

In the embodiments of the present invention, the first tuning element and the second tuning element may be tuning elements of a same type, or may be tuning elements of different types. This may be specifically determined according to an actual usage requirement, and is not limited in the embodiments of the present invention.

Optionally, in the embodiments of the present invention, the feed may be connected to a first location of the first radiator, the first tuning element may be connected to a second location of the first radiator, and the second tuning element may be connected to a third location of the second radiator. The first location is located between the second location and the third location.

Figure 6:
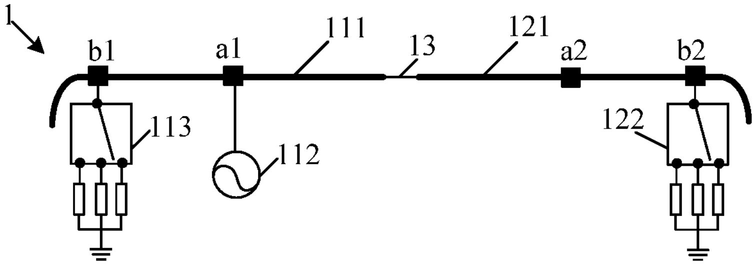
FIG. 6 is a schematic diagram of hardware of an antenna unit according to an embodiment of the present invention.

FIG. 6 is a schematic diagram of hardware of the antenna unit shown in FIG. 5 (FIG. 5 is a schematic structural diagram of the antenna unit). As shown in FIG. 6, the at least one first contact of the first radiator 111 may include a first contact a1 and a first contact b1. The first contact a1 may be located on a first location that is on the first radiator 111 and that is connected to the feed 112, and the first contact b1 may be located on a second location that is on the first radiator 111 and that is connected to the first tuning element 113.

Correspondingly, as shown in FIG. 6, the at least one second contact of the second radiator 121 may include a second contact a2 and a second contact b2. The second contact b2 may be located on a third location that is on the second radiator 121 and that is connected to the second tuning element 122, and the second contact a2 may be located on a fourth location on the second radiator 121. A distance between the fourth location and the connection component 13 is equal to a distance between the first location and the connection component 13.

As shown in FIG. 6, the first contact a1 and the second contact a2 are symmetrical relative to the connection component 13, and the first contact b1 and the second contact b2 are symmetrical relative to the connection component 13. In this way, when the angle between the first radiator 111 and the second radiator 121 is less than or equal to a first angle, that is, when the first radiator 111 and the second radiator 121 partially overlap or completely overlap, the second radiator may be electrically connected to the first radiator in the target manner, where the target manner is that the first contact a1 of the first radiator 111 is in contact with the second contact a2 of the second radiator 121, and the first contact b1 of the first radiator 111 is in contact with the second contact b2 of the second radiator 121. Therefore, the first radiator 111 and the second radiator 121 are connected through the first contact a1 and the second contact a2, and are connected through the first contact b1 and the second contact b2.

In this way, when the angle between the first radiator and the second radiator is less than or equal to the first angle, the first radiator and the second radiator form one radiator. This can reduce electromagnetic interference between the first radiator and the second radiator to some extent, that is, can reduce electromagnetic interference between the first antenna module and the second antenna module, thereby improving radiation performance of the antenna unit.

It should be noted that FIG. 6 uses an example in which the first radiator includes the first contact a1 and the first contact b1 and the second radiator includes the second contact a2 and the second contact b2 for description. It may be understood that in the embodiments of the present invention, the quantity of the first contacts is not limited to two, and the quantity of the second contact is not limited to two either. In addition, specific quantities and disposing locations of the first contact and the second contact may be determined according to an actual usage requirement, and are not limited in the embodiments of the present invention.

For example, in the embodiments of the present invention, the at least one first contact of the first radiator may further include the first contact disposed at one end of the first radiator, the at least one second contact of the second radiator may further include the second contact disposed at one end of the second radiator, and the end of the first radiator is disposed relative to the end of the second radiator. In this way, when the angle between the first radiator and the second radiator is less than or equal to the first angle, the first contact of the first radiator may be in contact with the second contact of the second radiator, and when the angle between the first radiator and the second radiator is greater than the second angle, the first contact of the first radiator and the second contact of the second radiator may be disconnected from each other.

The embodiments of the present invention provide an antenna unit. The antenna unit includes a first antenna module and a second antenna module. The first antenna module includes a first radiator and a feed connected to the first radiator, and the second antenna module includes a second radiator connected to the first radiator. The first radiator includes at least one first contact, and the second radiator includes at least one second contact. When an angle between the first radiator and the second radiator is less than or equal to a first angle, the second radiator is electrically connected to the first radiator in a target manner. The target manner is that N first contacts of the at least one first contact are correspondingly in contact with N second contacts of the at least one second contact, where N is a positive integer. In the embodiments of the present invention, when the antenna unit is applied to the terminal device and screens of the terminal device are in the folded state, after contacts are symmetrically disposed on the first radiator and the second radiator, the contact on the first radiator and the contact on the second radiator in the terminal device are correspondingly in contact with each other, so that the first radiator and the second radiator are connected as a whole through the contacts. Therefore, the two radiators are approximate to one radiator. Because a current flow direction in one radiator is consistent, this can reduce electromagnetic interference caused because currents of the two radiators flow in opposite directions when the two radiators are close to each other. Therefore, in the embodiments of the present invention, the performance of the antenna unit can be improved. That is, in the embodiments of the present invention, contacts are symmetrically disposed on the two radiators in the antenna unit, so that the performance of the antenna unit can be improved.

Figure 7:
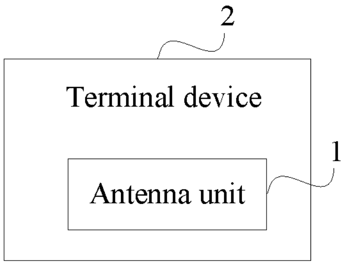
FIG. 7 is a first schematic structural diagram of a terminal device according to an embodiment of the present invention.

As shown in FIG. 7, the embodiments of the present invention provide a terminal device 2. The terminal device 2 may include the antenna unit 1 provided in the embodiments of the present invention. For specific description of the antenna unit 1, refer to related description of the antenna unit in the embodiments. Details are not described herein again.

Optionally, in the embodiments of the present invention, the terminal device provided in the embodiments of the present invention may further include a first housing and a second housing, where the first housing and the second housing may be movably connected. The first antenna module of the antenna unit in the embodiments of the present invention may be disposed in the first housing. The second antenna module of the antenna unit may be disposed in the second housing.

In the embodiments of the present invention, the movable connection may be jointed connection, that is, the first housing and the second housing may be connected through a movable connection component such as a pin shaft, a bolt, or a spherical node, so that the connected first housing and second housing may move or rotate relative to the connection component (for example, relative to a rotational shaft).

In the embodiments of the present invention, the terminal device provided in the embodiments of the present invention may be a terminal device with a foldable screen. The first screen and the second screen of the terminal device with foldable screens may fold or extend along a folding axis (for example, the folding axis AB shown in FIG. 9 below).

With reference to related description of the antenna unit, it may be understood that when the angle between the first radiator and the second radiator is less than or equal to a first angle, that is, the first screen and the second screen of the terminal device are in the folded state, the second radiator may be electrically connected to the first radiator in the target manner, where the target manner may be that N first contacts of the at least one first contact of the first radiator are correspondingly in contact with N second contacts of the at least one second contact of the second radiator (N is a positive integer). Certainly, when the first screen and the second screen of the terminal device are in a folded state, the second radiator and the first radiator may be further electrically connected through the connection component.

With reference to related description of the antenna unit, it may be further understood that when an angle between the first radiator and the second radiator is greater than a second angle, that is, the first screen and the second screen of the terminal device are in the extended state, the second radiator may be electrically connected to the first radiator through the connection component.

Optionally, in the embodiments of the present invention, the terminal device provided in the embodiments of the present invention may further include a first ground plate disposed in the first housing and a second ground plate disposed in the second housing. A first gap (also referred to as a fracture) exists between the first radiator of the first antenna module and the first ground plate, that is, the first radiator is not in contact with the first ground plate; and a second gap (also referred to as a fracture) exists between the second radiator of the second antenna module and the second ground plate, that is, the second radiator is not in contact with the second ground plate. The first gap and the second gap may be the same or different. This may be specifically determined according to an actual usage requirement, and is not limited in the embodiments of the present invention.

Optionally, in the embodiments of the present invention, the terminal device may further include the first screen disposed in the first housing and the second screen disposed in the second housing. The first ground plate is disposed in the first accommodation space formed by the first housing and the first screen, and the second ground plate is disposed in the second accommodation space formed by the second housing and the second screen.

It should be noted that in the embodiments of the present invention, the first antenna module and the first ground plate may be disposed in different areas that are in the first housing and that are in the first accommodation space formed by the first screen and the first housing. The second antenna module and the second ground plate may be disposed in different areas that are in the second housing and that are in the second accommodation space formed by the second screen and the second housing.

In the embodiments of the present invention, the first tuning element of the first antenna module and the second tuning element of the second antenna module are both grounded. For example, in the embodiments of the present invention, an example in which the first tuning element of the first antenna module is connected to the first ground plate, and the second tuning element of the second antenna module is connected to the second ground plate is used for description. It may be understood that the first tuning element and the second tuning element may be further grounded in any other possible manner. This may be specifically determined according to an actual usage requirement, and is not limited in the embodiments of the present invention.

Figure 8:
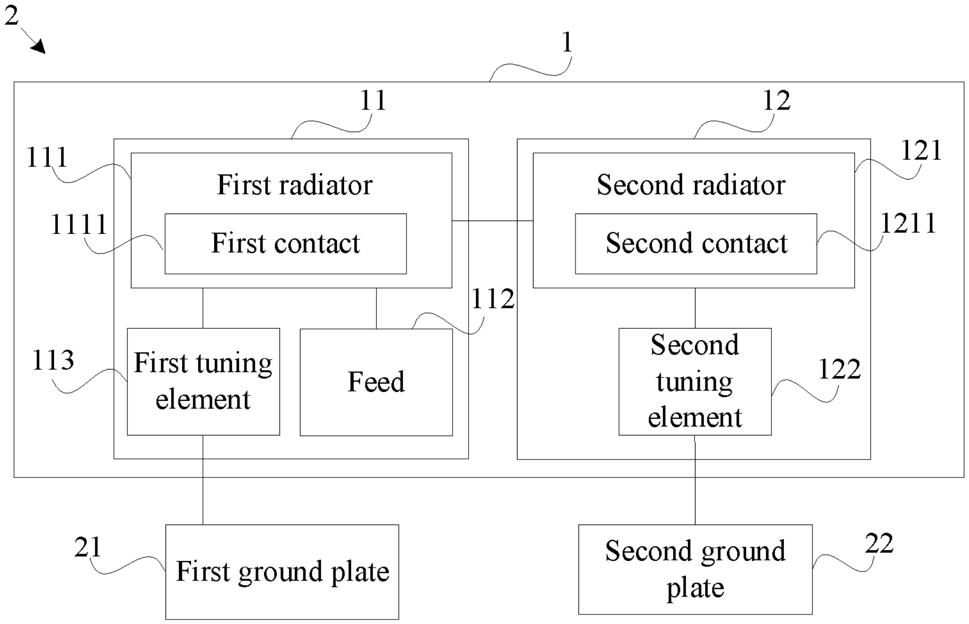
FIG. 8 is a second schematic structural diagram of a terminal device according to an embodiment of the present invention.

FIG. 8 is a schematic structural diagram of a terminal device according to an embodiment of the present disclosure. In the terminal device 2 shown in FIG. 8, the first tuning element 113 of the first antenna module 11 is connected to the first ground plate 21, and the second tuning element 122 of the second antenna module 12 is connected to the second ground plate 22.

Figure 9:
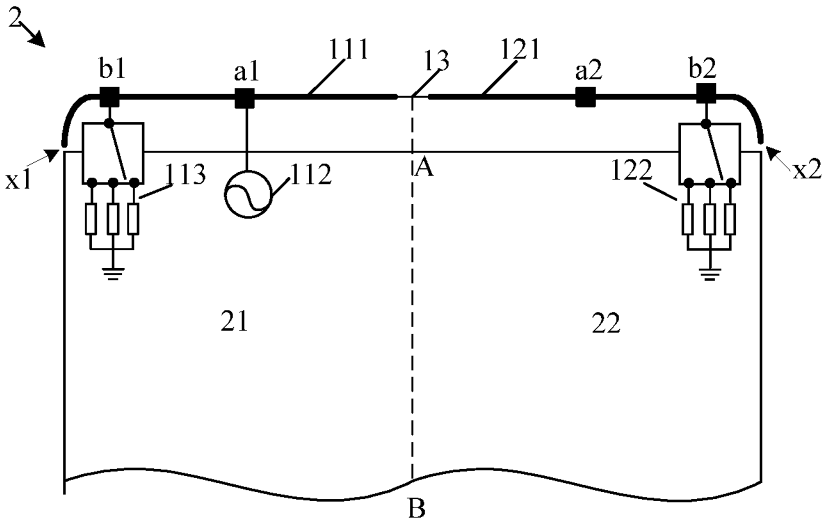
FIG. 9 is a first schematic diagram of hardware of a terminal device according to an embodiment of the present invention.

FIG. 9 is a schematic diagram of hardware of the terminal device shown in FIG. 8. As shown in FIG. 9, there is a specific gap (that is, a fracture) between an end x1 of the first radiator 111 of the first antenna module and the first ground plate 21, that is, the first radiator 111 and the first ground plate 21 are not directly connected. There is also a specific gap (that is, a fracture) between an end x2 of the second radiator 121 of the second antenna module and the second ground plate 22, that is, the second radiator 121 and the second ground plate 22 are not directly connected.

Optionally, in the embodiments of the present invention, as shown in FIG. 9, the first tuning element 113 may be disposed on a side close to the end x1 of the first radiator 111, so that the first tuning element 113 is connected to the first radiator 111 and the first ground plate 21. The second tuning element 122 may be disposed on a side close to the end x2 of the second radiator 121, so that the second tuning element 122 is connected to the second radiator 121 and the second ground plate 22.

It should be noted that specific disposing locations of the first tuning element and the feed of the first antenna module and the second tuning element of the second antenna module may be specifically determined according to an actual usage requirement, and are not limited in the embodiments of the present invention.

Optionally, in the embodiments of the present invention, the first ground plate may include at least one third contact, and the second ground plate may include at least one fourth contact. When the angle between the first ground plate and the second ground plate is less than or equal to the first angle, that is, when the first ground plate and the second ground plate partially overlap or completely overlap (for example, when the screens of the terminal device are in the folded state). M third contacts of the at least one third contact are correspondingly in contact with M fourth contacts of the at least one fourth contact (M is a positive integer). It should be noted that for specific description of the first angle, refer to related description of the first angle in the embodiments. Details are not described herein again.

Figure 10:
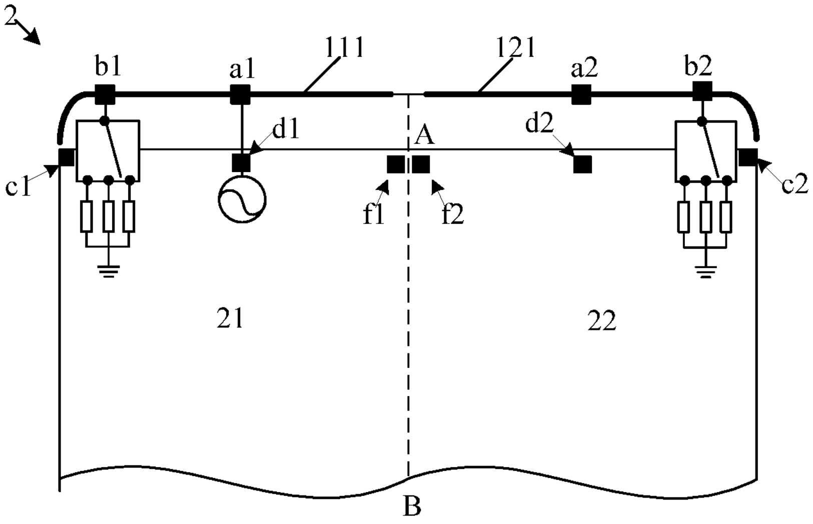
FIG. 10 is a second schematic diagram of hardware of a terminal device according to an embodiment of the present invention.

For example, as shown in FIG. 10, the first ground plate 21 may include three third contacts, that is, c1, d1, and f1, the second ground plate 22 may include three fourth contacts, that is, c2, d2, and f2, and the third contacts c1, d1, and f1 and the fourth contacts c2, d2, and f2 are symmetrical relative to the connection component 13. When the angle between the first ground plate 21 and the second ground plate 22 is less than or equal to the first angle, that is, when screens of the terminal device are in the folded state, the three third contacts c1, d1, and f1 and the three fourth contacts c2, d2, and f2 may be in contact in one-to-one correspondence. That is, the third contact c1 of the first ground plate 21 is in contact with the fourth contact c2 of the second ground plate 22, the third contact d1 of the first ground plate 21 is in contact with the fourth contact d2 of the second ground plate 22, and the third contact f1 of the first ground plate 21 is in contact with the fourth contact f2 of the second ground plate 22. Therefore, the first ground plate 21 and the second ground plate 22 are connected through the third contact c1 and the fourth contact c2, are connected through the third contact d1 and the fourth contact d2, and are connected through the third contact f1 and the fourth contact f2.

Therefore, when the angle between the first ground plate and the second ground plate is less than or equal to the first angle, that is, when screens of the terminal device are in the folded state, the first ground plate and the second ground plate form one ground plate. This can improve radiation performance of the antenna unit of the terminal device to some extent.

It should be noted that FIG. 10 uses an example in which the first ground plate includes the third contacts c1, d1, and f1 and the second ground plate includes the fourth contacts c2, d2, and f2 for description. It may be understood that in the embodiments of the present invention, the quantity of the third contacts is not limited to three, and the quantity of the fourth contacts is not limited to two. In addition, specific quantities and disposing locations of the third contact and the fourth contact may be determined according to an actual usage requirement, and are not limited in the embodiments of the present invention.

Optionally, in the embodiments of the present invention, when the angle between the first screen and the second screen of the terminal device is 180°, that is, when screens of the terminal device are in the extended state, the antenna unit of the terminal device may be a loop (Loop) antenna, and a current path of the antenna unit of the terminal device may be understood as one or two loops.

When the angle between the first screen and the second screen is 0° (for example, the terminal device is in a standby state) or 360° (for example, the terminal device is in a single-screen usage state), that is, when screens of the terminal device are in the folded state, the antenna unit of the terminal device may be an inverted-F antenna (Inverted-F antenna, IFA), and a current path of the antenna unit of the terminal device may be understood as being similar to an inverted-F shape.

With reference to FIG. 11 to FIG. 15, the following describes an example of a current flow path of the antenna unit in the embodiments of the present invention in a signal radiation process when the angle between the first screen and the second screen is 180° (that is, screens of the terminal device are in the extended state) and when the angle between the first screen and the second screen is 0° or 360° (that is, screens of the terminal device are in the folded state).

For ease of description, different locations are marked on the first radiator and the second radiator of the antenna unit below; to describe an example of a current flow path of the antenna unit in a signal radiation process.

Optionally, in the embodiments of the present invention, because different locations of the first radiator are connected to the feed, the first tuning element, and the second radiator, the different locations may be marked on the first radiator according to the connection relationship, that is, a first location, a second location, and a fifth location below; where the first location, the second location, and the fifth location are all different.

Figure 11:
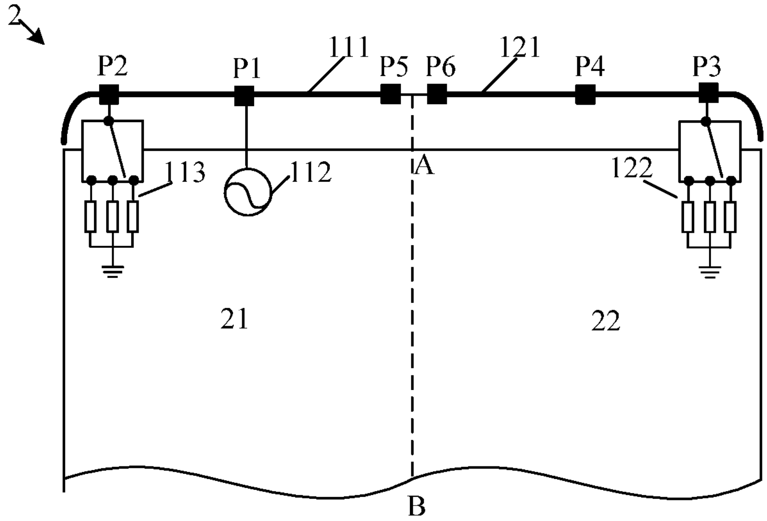
FIG. 11 is a third schematic diagram of hardware of a terminal device according to an embodiment of the present invention.

As shown in FIG. 11, a location P1 of the first radiator 111 that is connected to the feed 112 (that is, a location provided with the first contact a1) may be marked as the first location, a location P2 of the first radiator 111 that is connected to the first tuning element 113 (that is, a location provided with the first contact b1) may be marked as the second location, and a location P5 of the first radiator 111 that is electrically connected to the second radiator 121 may be marked as the fifth location.

It should be noted that in the embodiments of the present invention, the foregoing embodiments all use an example of one feed and one first tuning element for description. During actual implementation, there may be a plurality of feeds and first tuning elements. It may be understood that when there are a plurality of feeds and first tuning elements, there may also be a plurality of first locations and second locations, that is, each feed corresponds to one first location, and each first tuning element corresponds to one second location.

Optionally, in the embodiments of the present invention, because different locations of the second radiator are connected to the first radiator and the second tuning element, the different locations may be marked on the second radiator according to the connection relationship, that is, a third location, a fourth location, and a sixth location below; where the third location, the fourth location, and the sixth location are all different.

As shown in FIG. 11, a location P3 of the second radiator 121 that is connected to the second tuning element 122 (that is, a location provided with the second contact b2) may be marked as the third location, a location P4 of the second radiator 121 that is symmetrical to the first location P1 (that is, a location provided with the second contact a2) may be marked as the fourth location, and a location P6 of the second radiator 121 that is electrically connected to the first radiator 111 may be marked as the sixth location.

It should be noted that in the embodiments of the present invention, the foregoing embodiments all use an example of one second tuning element for description. During actual implementation, there may be a plurality of second tuning elements. It may be understood that when there are a plurality of second tuning elements, there may also be a plurality of third locations, that is, each second tuning element corresponds to one third location.

In the embodiments of the present invention, a radiation frequency (also referred to as a resonant frequency) of the antenna unit may be in a first band, or may be in a second band. A maximum value of the first band may be less than or equal to a minimum value of the second band. For ease of description and understanding, the first band may be referred to as a low frequency range and the second band may be referred to as a high frequency range below:

Optionally, in the embodiments of the present invention, the first band may be [700 MHZ (MHz), 960 MHz]. The second band may be [1710 MHZ, 2690 MHz]. It may be understood that the first band and the second band are only examples for description. This may be specifically determined according to an actual usage requirement, and is not limited in the embodiments of the present invention.

Figure 12:
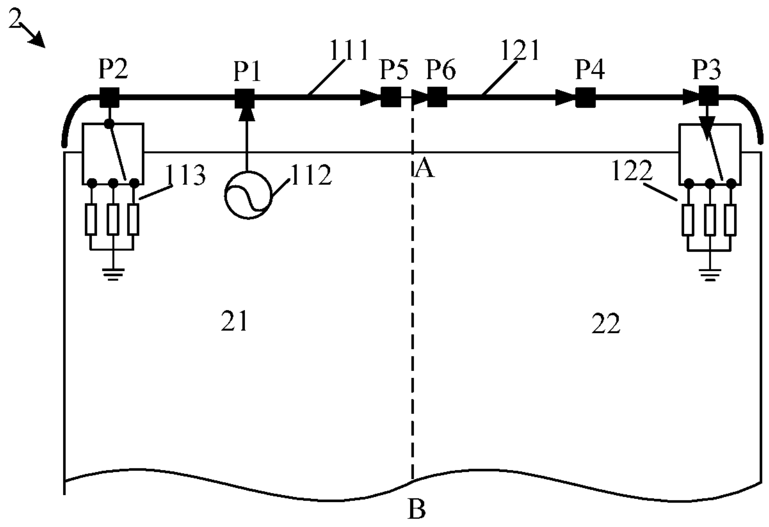
FIG. 12 is a fourth schematic diagram of hardware of a terminal device according to an embodiment of the present invention.
Figure 13:
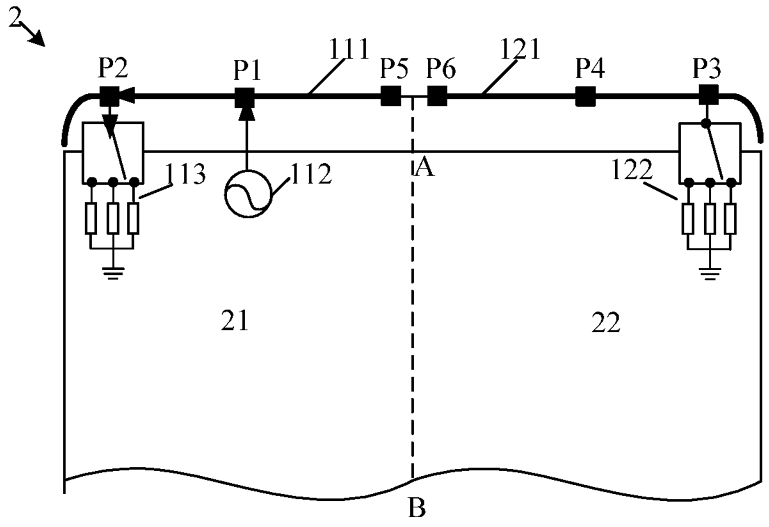
FIG. 13 is a fifth schematic diagram of hardware of a terminal device according to an embodiment of the present invention.

With reference to FIG. 12 and FIG. 13, by using locations marked on the first radiator 111 and locations marked on the second radiator 121 shown in FIG. 11, the following describes an example of a current flow path of the antenna unit when the screens of the terminal device are in the extended state and the radiation frequency of the antenna unit is within a low frequency range and a high frequency range.

When the radiation frequency of the antenna unit is in the first band (that is, a low frequency range), in the signal radiation process of the antenna unit, as shown in FIG. 12, a current of the antenna unit may flow along a direction indicated by the arrow in FIG. 12, that is, starts from the feed 112, first flows to the first radiator 111, and sequentially passes through the first location P1 and the fifth location P5 of the first radiator 111 to flow to the second radiator 121, sequentially passes through the sixth location P6, the fourth location P4, and the third location P3 of the second radiator 121 to flow to the second tuning element 122, and then passes through the second tuning element 122 to flow to the second ground plate 22.

In the current flow path of the antenna unit, the resonant length of the antenna unit may be indicated by the distance between the first location P1 and the fifth location P5 of the first radiator 111 and the distance between the sixth location P6 and the fourth location P4 of the second radiator 121. In addition, the resonant length of the antenna unit may be further tuned by the second tuning element 122. In the embodiments of the present invention, when screens of the terminal device are in the extended state, during low-frequency resonance, a low-frequency resonant frequency generated by the antenna unit may cover a wider low frequency range compared with the prior art.

When the radiation frequency of the antenna unit is in the second band (that is, a high frequency range), in the signal radiation process of the antenna unit, as shown in FIG. 13, a current of the antenna unit may flow along a direction indicated by the arrow in FIG. 13, that is, starts from the feed 112, first flows to the first radiator 111, and sequentially passes through the first location P1 and the second location P2 of the first radiator 111 to flow to the first tuning element 113, and then passes through the first tuning element 113 to flow to the first ground plate 21.

In the current flow path of the antenna unit, the resonant length of the antenna unit may be indicated by the distance between the first location P1 and the second location P2 of the first radiator 111. In addition, the resonant length of the antenna unit may be further tuned by the first tuning element 113. In the embodiments of the present invention, when screens of the terminal device are in the extended state, during high-frequency resonance, a high-frequency resonant frequency generated by the antenna unit may cover a wider high frequency range compared with the prior art.

Figure 14:
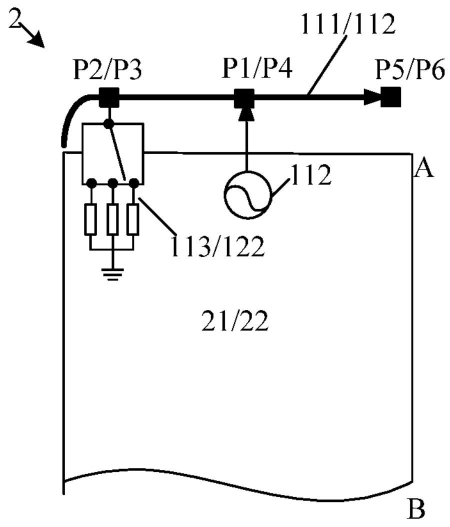
FIG. 14 is a sixth schematic diagram of hardware of a terminal device according to an embodiment of the present invention.
Figure 15:
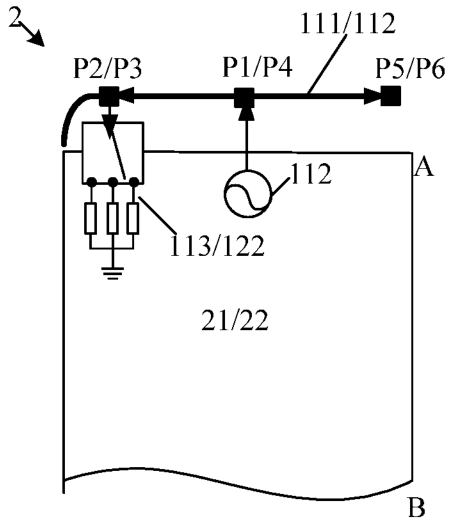
FIG. 15 is a seventh schematic diagram of hardware of a terminal device according to an embodiment of the present invention.

With reference to FIG. 14 and FIG. 15, by using locations marked on the first radiator 111 and locations marked on the second radiator 121 shown in FIG. 11, the following describes an example of a current flow path of the antenna unit when the screens of the terminal device are in the folded state and the radiation frequency of the antenna unit is within a low frequency range and a high frequency range.

When the radiation frequency of the antenna unit is in the first band (that is, a low frequency range), in the signal radiation process of the antenna unit, as shown in FIG. 14, a current of the antenna unit may flow along a direction indicated by the arrow in FIG. 14, that is, starts from the feed 112, first flows to the first radiator 111, and passes through the first location P1 of the first radiator 111 to flow to the fifth location P5 of the first radiator 111 (that is, flows to the end of an open circuit). In addition, the current of the antenna unit may start from the feed 112, first flows to the first radiator 111, and passes through the first location P1 of the first radiator 111 to flow to the fourth location P4 of the second radiator 121, and then passes through the fourth location P4 to flow to the sixth location P6 of the second radiator 121 (that is, flows to the end of an open circuit). It should be noted that in a process in which the current of the antenna unit flows to the fifth location P5 of the first radiator 111 (or the sixth location P6 of the second radiator 121), a part of the current may radiate through the first radiator 111, and the other part of the current may flow to the fifth location P5 (that is, flow to the sixth location P6 of the second radiator 121), and then pass through the second radiator 121 to flow to the fourth location P4, pass through the fourth location P4 and the third location P3 to flow to the second tuning element 122, and pass through the second tuning element 122 to flow to the second ground plate 22: or the other part of the current may flow to the fifth location P5, and then pass through the first radiator 111 to flow to the first location P1, pass through the first location P1 and the second location P2 to flow to the first tuning element 113, and pass through the first tuning element 113 to flow to the first ground plate 21.

When the radiation frequency of the antenna unit is in the second band (that is, a high frequency range), in the signal radiation process of the antenna unit, as shown in FIG. 15, a current of the antenna unit may flow along a direction indicated by the arrow in FIG. 15, that is, starts from the feed 112, first flows to the first radiator 111, and sequentially passes through the first location P1 and the second location P2 of the first radiator 111 to flow to the first tuning element 113, and then passes through the first tuning element 113 to flow to the first ground plate 21. Alternatively, the current of the antenna unit may start from the feed 112, first flow to the first radiator 111, and sequentially pass through the first location P1 of the first radiator 111 and the fourth location P4 and the third location P3 of the second radiator 121 to flow to the second tuning element 122, and then pass through the second tuning element 122 to flow to the second ground plate 22.

As shown in FIG. 14 and FIG. 15, when screens of the terminal device are in the folded state, after contacts are symmetrically disposed on the first radiator and the second radiator, the contact on the first radiator and the contact on the second radiator in the terminal device are correspondingly in contact with each other, so that the first radiator and the second radiator are connected as a whole through the contacts. Therefore, the two radiators are approximate to one radiator. Because a current flow direction in one radiator is consistent and there is basically no interference and spurious wave, this can reduce to some extent electromagnetic interference caused because currents of the two radiators flow in opposite directions when the two radiators are close to each other. Therefore, in the embodiments of the present invention, the performance of the antenna unit can be improved.

Optionally, in the embodiments of the present invention, the terminal device may use a sensor (for example, a magnetic sensor) or an angle detection circuit of the terminal device to detect that the angle between the first screen and the second screen of the terminal device is 180° (that is, screens of the terminal device are in the extended state), and the angle between the first screen and the second screen of the terminal device is 0° or 360° (that is, screens of the terminal device are in the folded state). The terminal device may adjust the first tuning element and/or the second tuning element or the like according to different states of screens of the terminal device, so that the antenna unit has different performance when screens of the terminal device are in different states, so that the antenna unit may have desirable performance in different situations.

For example, when screens of the terminal device are in the extended state, the terminal device may control the first tuning element and the second tuning element to both switch on: when screens of the terminal device are in the folded state, the terminal device may control one of the first tuning element and the second tuning element to switch on and the other to switch off.

It should be noted that the terminal device usually includes an upper antenna unit and a lower antenna unit. In the foregoing embodiments of the present invention, the upper antenna unit (that is, the antenna unit described in the foregoing embodiments) is used as an example for description. It may be understood that a specific structure and a working principle of the lower antenna unit and application in the terminal device are all similar to those of the upper antenna unit. For specifics, refer to related descriptions of the upper antenna unit in the foregoing embodiments. Details are not described herein again.

The embodiments of the present invention provide a terminal device, the terminal device includes an antenna unit, the antenna unit includes the first antenna module and the second antenna module, the first antenna module includes the first radiator and the feed connected to the first radiator, and the second antenna module includes the second radiator connected to the first radiator. The first radiator includes the at least one first contact, and the second radiator includes the at least one second contact. When the angle between the first radiator and the second radiator is less than or equal to the first angle, the second radiator is electrically connected to the first radiator in the target manner. The target manner is that N first contacts of the at least one first contact are correspondingly in contact with N second contacts of the at least one second contact, where N is a positive integer. In the embodiments of the present invention, when the antenna unit is applied to the terminal device and screens of the terminal device are in the folded state, after contacts are symmetrically disposed on the first radiator and the second radiator, the contact on the first radiator and the contact on the second radiator in the terminal device are correspondingly in contact with each other, so that the first radiator and the second radiator are connected as a whole through the contacts. Therefore, the two radiators are approximate to one radiator. Because a current flow direction in one radiator is consistent, this can reduce electromagnetic interference caused because currents of the two radiators flow in opposite directions when the two radiators are close to each other. Therefore, in the embodiments of the present invention, the performance of the antenna unit can be improved.

It should be noted that the terms “include”, “comprise” or any other variants thereof herein are intended to cover a non-exclusive inclusion, so that a process, a method, an article or equipment that includes a list of elements not only includes those elements, and further includes another element not expressly listed, or an element inherent to such a process, a method, an article, or equipment. In the absence of more restrictions, an element defined by the statement “including a . . . ” does not exclude presence of another same element in a process, method, article, or apparatus that includes the element.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

The invention claimed is:

1. An antenna unit, wherein the antenna unit comprises a first antenna module and a second antenna module:

the first antenna module comprises a first radiator and a feed connected to the first radiator, and the second antenna module comprises a second radiator; and the first radiator comprises at least one first contact, and the second radiator comprises at least one second contact; and when an angle between the first radiator and the second radiator is less than or equal to a first angle, the second radiator is electrically connected to the first radiator in a target manner, wherein the target manner is that N first contacts of the at least one first contact are correspondingly in contact with N second contacts of the at least one second contact, and N is a positive integer;

wherein the antenna unit further comprises a connection component, and when an angle between the first radiator and the second radiator is greater than a second angle, the second radiator is electrically connected to the first radiator through the connection component, wherein the first antenna module further comprises a first tuning element connected to the first radiator;

wherein the second antenna module further comprises a second tuning element connected to the second radiator.

2. The antenna unit according to claim 1, wherein when an angle between the first radiator and the second radiator is less than or equal to a first angle, the second radiator is also electrically connected to the first radiator through the connection component.

3. A terminal device, comprising the antenna unit according to claim 2.

4. The antenna unit according to claim 1, wherein the feed is connected to a first location of the first radiator, the first tuning element is connected to a second location of the first radiator, and the second tuning element is connected to a third location of the second radiator, wherein the first location is located between the second location and the third location.

5. The antenna unit according to claim 4, wherein the at least one first contact comprises two first contacts, one of the two first contacts is located on the first location of the first radiator, and the other of the two first contacts is located on the second location of the first radiator; and the at least one second contact comprises two second contacts, one of the two second contacts is located on the third location of the second radiator, the other of the two second contacts is located on a fourth location of the second radiator, and a distance between the fourth location and the connection component is equal to a distance between the first location and the connection component.

6. A terminal device, comprising the antenna unit according to claim 5.

7. A terminal device, comprising the antenna unit according to claim 4.

8. A terminal device, comprising the antenna unit according to claim 1.

9. The terminal device according to claim 8, wherein the terminal device further comprises a first housing and a second housing, and the first housing is movably connected to the second housing; and the first antenna module of the antenna unit is disposed in the first housing, and the second antenna module of the antenna unit is disposed in the second housing.

10. The terminal device according to claim 9, wherein the terminal device further comprises a first ground plate disposed in the first housing and a second ground plate disposed in the second housing; and a first gap exists between the first radiator of the first antenna module and the first ground plate, and a second gap exists between the second radiator of the second antenna module and the second ground plate.

11. The terminal device according to claim 10, wherein the first ground plate comprises at least one third contact, the second ground plate comprises at least one fourth contact, and when an angle between the first housing and the second housing is less than or equal to a first angle, M third contacts of the at least one third contact are correspondingly in contact with M fourth contacts of the at least one fourth contact, wherein M is a positive integer.

12. The terminal device according to claim 11, wherein when the angle between the first housing and the second housing is 180°, the antenna unit is a loop antenna; and when the angle between the first housing and the second housing is 0° or 360°, the antenna unit is an inverted-F antenna IFA.

13. The terminal device according to claim 9, wherein when the angle between the first housing and the second housing is 180°, the antenna unit is a loop antenna; and when the angle between the first housing and the second housing is 0° or 360°, the antenna unit is an inverted-F antenna IFA.

14. The terminal device according to claim 10, wherein when the angle between the first housing and the second housing is 180°, the antenna unit is a loop antenna; and when the angle between the first housing and the second housing is 0° or 360°, the antenna unit is an inverted-F antenna IFA.

* * * * *